(12) United States Patent
Frost

(10) Patent No.: US 6,652,660 B2
(45) Date of Patent: Nov. 25, 2003

(54) METHOD FOR TREATING HAZARDOUS AND CORROSION-INDUCING SULFUR COMPOUNDS

(75) Inventor: Jack G. Frost, Duncan, OK (US)

(73) Assignee: United Laboratories Intl., LLC, Duncan, OK (US)

( * ) Notice: Subject to any disclaimer, the term of this patent is extended or adjusted under 35 U.S.C. 154(b) by 0 days.

(21) Appl. No.: 10/349,647

(22) Filed: Jan. 23, 2003

(65) Prior Publication Data

US 2003/0118470 A1 Jun. 26, 2003

Related U.S. Application Data

(63) Continuation of application No. 09/665,453, filed on Sep. 19, 2000, now Pat. No. 6,547,959.

(51) Int. Cl.$^7$ .................................................. C23G 1/00
(52) U.S. Cl. ................... 134/2; 422/7; 208/47; 585/950; 148/240; 148/277; 423/544; 423/567.1
(58) Field of Search ............................... 422/7; 208/47; 585/950; 134/2; 148/240, 277; 423/544, 567.1

(56) References Cited

U.S. PATENT DOCUMENTS

| | | | |
|---|---|---|---|
| 4,839,154 A | * 6/1989 | Allison et al. | 423/544 |
| 5,459,066 A | 10/1995 | Mestetsky | |
| 6,160,193 A | 12/2000 | Gore | 208/208 R |
| 6,274,785 B1 | 8/2001 | Gore | 208/208 R |

FOREIGN PATENT DOCUMENTS

JP        52112609 A        9/1997

OTHER PUBLICATIONS

Protection of Austenitic Stainless Steels Nace RP0170–97 #21002 Mar. 10, 1997.

* cited by examiner

Primary Examiner—Walter D. Griffin

(57) ABSTRACT

A method for treating compounds which contain reactive sulfur is disclosed, wherein the treatment produces compounds which contain sulfur in a non reactive form. The method is based on the use of an oxidizing compound selected from the group consisting of water soluble inorganic persulfates, water soluble inorganic and organic adducts of hydrogen peroxide and mixtures thereof. The method is particularly useful in preventing stress corrosion cracking of stainless steel and in preventing auto-ignition of pyrophoric iron sulfide.

7 Claims, No Drawings

METHOD FOR TREATING HAZARDOUS AND CORROSION-INDUCING SULFUR COMPOUNDS

REFERENCE TO PREVIOUS APPLICATIONS

This is a Continuation of application Ser. No. 09/665,453 filed Sep. 19, 2000, now U.S. Pat. No. 6,547,959.

BACKGROUND OF THE INVENTION

1. Technical Field of the Invention

This invention relates to a method of treating materials which contain sulfur. The invention further relates to a method of treating compounds which contain sulfur in a reactive form to produce different compounds which do not contain sulfur in a reactive form. The invention also relates to a method of treating reactive compounds which contain sulfur in a reactive form to render such compounds inactive. The invention particularly relates to a method of treating sulfur containing compounds which do cause stress corrosion cracking to produce different sulfur containing compounds which do not cause stress corrosion cracking. The invention also particularly relates to a method of treating sulfur containing compounds to prevent spontaneous combustion of such compounds. The invention more particularly relates to a method of preventing stress corrosion cracking of certain high carbon content stainless steel and to a method of preventing spontaneous ignition of metal sulfides.

2. Description of the Prior Art and Problems Solved

For a variety of reasons, including, but not limited to, economic, environmental, mechanical and chemical, materials, such as crude oil, which are contaminated with compounds which contain sulfur in a reactive form, such as sulfides and mercaptans, are not useful, or, at least, are not desirable, as a fuel or as an industrial raw material. Accordingly, materials which do contain compounds having sulfur in a reactive form dispersed or dissolved therein have been treated to actually remove such compounds therefrom or to convert such compounds to another form. For purposes of this invention, sulfur in a reactive form is defined as hazardous sulfur and compounds which contain sulfur in a reactive form are referred to as hazardous sulfur containing compounds.

When certain hazardous sulfur containing compounds, such as sulfides and mercaptans, are converted to another form, as mentioned above, the resulting compounds can also include sulfur in a reactive form. The term "sulfides," as used herein, includes water soluble sulfides, such as hydrogen sulfide and alkali metal sulfides, i.e., sodium sulfide, and water insoluble sulfides, such as transitional metal sulfides, i.e., iron sulfide, nickel sulfide and chromium sulfide. Examples of resulting compounds which contain sulfur in a reactive form include sulfites and a variety of compounds which contain sulfur-to-sulfur bonds. Compounds which contain hazardous sulfur, as defined above, such as the mentioned resulting compounds, are a potential source of damage to certain industrial equipment as well as a potential source of danger to the physical health of people. It is known that persons who process materials which contain sulfides and/or mercaptans which, for purposes of this invention, are referred to herein as precursor compounds, take special precautions with respect to the handling, treatment and containment of such precursor compounds. A problem of long standing thus comprises the selection and employment of compositions, methods and apparatus for treating and handling and/or for rendering safe and harmless the precursor-compounds as well as the reaction products thereof.

Persons having working experience in the petro-chemical industry believe that the surfaces of certain high carbon content stainless steel, such as the interior surfaces of process vessels, can suffer a type of damage referred to as stress corrosion cracking at times when such surfaces are exposed to an oxygen containing atmosphere, such as air, while the surfaces are in contact with the mentioned precursor compounds. In this regard, persons skilled in the art believe that the mentioned precursor compounds, i.e., sulfides and mercaptans, can be partially converted by oxidation to specific classes of compounds and mixtures of such compounds which contain sulfur-to-sulfur bonds, if the precursor compounds are exposed to an oxygen containing environment, such as air, in the presence of water and at a pH less than 7.

Accordingly, this invention is directed, in part, to water soluble compounds which contain sulfur-to-sulfur bonds. It is believed that compounds containing sulfur-to-sulfur bonds which are soluble in oil, but which are not soluble in water, such as organic disulfides, are not a source of stress corrosion cracking. Examples of compounds which contain sulfur-to-sulfur bonds which are soluble in water include thiosulfates, polythionates and dithionites. For convenience, water soluble compounds which contain sulfur-to-sulfur bonds are referred to herein as reactive multi-sulfur compounds.

It is believed that reactive multi-sulfur compounds can cause stress corrosion cracking of certain types of high carbon content stainless steels, such as 301, 304 and 316 stainless steel. In this regard, if the mentioned precursor compounds are converted to reactive multi-sulfur compounds, as above described, then it is believed that the anions of such reactive multi-sulfur compounds in contact with the mentioned stainless steel, while in the presence of oxygen at a pH of less than 7, can cause stress corrosion cracking of the steel. The probability of the occurrence of such damage is ordinarily quite high at times when a stainless steel vessel containing the precursor compounds, and perhaps even a quantity of the reactive multi-sulfur compounds, is opened to the atmosphere to be cleaned and/or decontaminated with an aqueous based agent.

Low carbon content stainless steels are not believed to be susceptible to stress corrosion cracking.

Thus, to prevent stress corrosion cracking, it is desirable to employ a method to prevent the conversion of precursor compounds to reactive multi-sulfur compounds or to employ a method to prevent contact between reactive multi-sulfur compounds and stainless steel under conditions which promote stress corrosion cracking.

A method employed in the prior art to prevent stress corrosion cracking of a stainless steel surface in contact with an aqueous solution of a reactive multi-sulfur compound comprises shielding the wet surface from air with a solution having a pH greater than 7. This method has been extensively employed while cleaning heat exchanger bundles and has been referred to in the art as the "cover and hope" technique.

Austenitic steel is a stainless steel which is susceptible to stress corrosion cracking by the above described process. Austenitic steel is a steel containing sufficient amounts of nickel, nickel and chromium, or manganese to retain austenite at atmospheric temperature. Austenite, originally known as a solid solution of carbon in y-iron, now includes all solid solutions based on $\gamma$-iron. (See Chambers's Technical Dictionary, Tweeny & Hughes, MacMillan Company, New York, 1957, page 60.)

The problem of stress corrosion cracking of austenitic steel is addressed in "Protection of Austenitic Stainless Steels and Other Austenitic Alloys From Polythionic Acid Stress Corrosion Cracking During Shutdown of Refinery Equipment," NACE Standard RP0170-97, item No. 21002, dated Mar. 10, 1997.

In addition to the above, persons having working experience in the petrochemical industry also believe that vessels constructed of ordinary steel or low carbon content stainless steel, while not being particularly vulnerable to stress corrosion cracking, are subject to fires caused by the spontaneous ignition of iron reaction products, such as iron sulfide, examples of which are troilite, FeS, and pyrite, $FeS_2$, marcasite and pyrrhotite. In this regard, a vessel constructed of ordinary steel or low carbon content stainless steel upon being exposed to a material, such as crude oil, containing the mentioned precursor compounds, can be corroded by the precursor compounds to form water-insoluble and oil-insoluble iron sulfide. In this connection, sulfide, a hazardous sulfur as defined above, reacts with iron in the vessel to form one or more of the iron sulfides mentioned above. The iron sulfide product can be, in a very finely divided physical form and, thus, possess a surface area so large that the product, upon contact with an oxygen containing atmosphere, such as air, is rapidly oxidized with a release of heat of intensity sufficient to cause spontaneous ignition. Iron sulfide in such a finely divided physical form is referred to as pyrophoric iron sulfide or, commonly, as "pyrophoric iron." If the presence of pyrophoric iron is suspected, then persons skilled in the art have taken great care to prevent contact between the pyrophoric iron and air, such as the performance of multiple washing steps to flush the pyrophoric iron from the vessel.

Stainless steel of the type believed to be susceptible to stress corrosion cracking is not believed to be subject to corrosion by sulfide. Accordingly, iron sulfide is not formed when a soluble sulfide contacts such steel. However, vessels constructed of such steel can include mild steel components which can be corroded to form iron sulfide and/or are connected to and be in fluid communication with vessels constructed of steel which can be corroded to form insoluble iron sulfide. In either situation, pyrophoric iron can be present in a vessel which is subject to stress corrosion cracking.

Accordingly, this invention is also directed, in part, to a method of treating pyrophoric iron to prevent the spontaneous combustion thereof in the presence of air or other oxygen containing gas.

These and other problems are solved by the method of this invention. Thus, by the method of this invention, compounds which cause stress corrosion cracking are converted to compounds which do not cause stress corrosion cracking, and the auto ignition of pyrophoric iron is prevented.

DISCLOSURE OF INVENTION
1. Summary of the Invention

In one aspect, this invention provides a method of treating a reactive compound which contains sulfur in a reactive form with a suitable oxidizing agent, such as one selected from the group consisting of water soluble inorganic persulfates, water soluble inorganic adducts of hydrogen peroxide, water soluble organic adducts of hydrogen peroxide and mixtures thereof, to produce a different compound which does not contain sulfur in a reactive form to thereby prevent contact of a reactive multi-sulfur compound, and/or a precursor thereof, with the surface of any material, such as the surface of a vessel susceptible to stress corrosion cracking. The method is particularly useful in situations wherein an aqueous solution of a reactive multi-sulfur compound, and/or a precursor thereof, is likely to contact the said surface while such solution is in the presence of oxygen at a pH less than 7. The method of this invention is, accordingly, useful to decontaminate and clean a vessel containing surfaces in contact with, or subject to being in contact with, sulfides, mercaptans, sulfites, reactive multi-sulfur compounds and/or mixtures thereof.

In another aspect, this invention provides a method of treating the surface of pyrophoric iron sulfide with a suitable oxidizing agent, such as one selected from the group consisting of water soluble inorganic persulfates, water soluble inorganic adducts of hydrogen peroxide, water soluble organic adducts of hydrogen peroxide and mixtures thereof, to form a film on the surface of the iron sulfide whereby the film shields the surface of the iron sulfide from an environment containing oxygen in the gas phase to thereby prevent spontaneous ignition of the pyrophoric iron sulfide.

The method of this invention is based on the discovery that the oxidizing agent employed will prevent the formation and/or continued existence of reactive multi-sulfur compounds by converting the sulfur content of water soluble precursor compounds, i.e., sulfides and mercaptans, the sulfur content of water soluble sulfites and the sulfur content of water soluble reactive multi-sulfur compounds from a reactive form to a non-reactive form.

Stress corrosion cracking of stainless steel, as above described, does not occur in the absence of contact between the steel and a reactive multi-sulfur compound.

The method of this invention is also based on the discovery that the oxidizing agent employed will prevent spontaneous ignition of pyrophoric iron sulfide in the presence of an environment, such as air, containing oxygen in the gas phase by forming a layer or film of insoluble ferric oxide, $Fe_2O_3 \cdot xH_2O$, on the surface of insoluble iron sulfide to thereby shield the surface of the insoluble iron sulfide from oxygen.

The method of this invention simultaneously converts the sulfur content of precursor compounds, i.e., sulfides and mercaptans, the sulfur content of sulfites and the sulfur content of reactive multi-sulfur compounds from reactive forms to a non-reactive form and produces a layer or film of insoluble ferric oxide, $Fe_2O_3 \cdot xH_2O$, on the surface of insoluble iron sulfide.

For purposes of this invention, sulfur in a reactive form is defined as having a valence in the range of from −2 to +5 and sulfur in a non-reactive form is defined as being elemental sulfur or as having a valence of +6.

A reactive multi-sulfur compound is defined herein as a compound having an anion containing at least one sulfur-to-sulfur bond. The anion is more particularly defined by the general structure:

$$[SO_a - S_x - SO_b]^{-2} \qquad (1)$$

wherein X is 0 to 4, a is 0 to 3, and b is 2 or 3.

2. Description of the Preferred Embodiments

In broad terms, the method of this invention is comprised of contacting a hazardous sulfur containing compound, including pyrophoric iron sulfide, with an aqueous solution of a suitable oxidizing agent and maintaining the contact for a time sufficient to produce elemental sulfur and/or to increase the valence of all the sulfur present in the hazardous sulfur containing compound which is contacted by the oxidizing agent from a value in the range of from about −2 to about +5 to a value of +6. In this regard it is to be understood that once a film of ferric oxide is formed on the surface of insoluble iron sulfide that the oxidizing agent is no longer in contact with any hazardous sulfur thus shielded by the film of ferric oxide.

The method of this invention is comprised of contacting a compound (or compounds) containing sulfur having a valence in the range of from about −2 to about +5 with an effective quantity of a suitable oxidizing agent having strength sufficient to convert the sulfur in the compound to a non-reactive form. According to the method, the said contacting is maintained for a time and under conditions sufficient to produce the said conversion which is complete when the sulfur contacted is converted to elemental sulfur and/or the valence state of the sulfur is increased to a value of +6.

The valence of sulfur in sulfides and mercaptans is −2; the valence of sulfur in sulfites is +4; the valence of sulfur in thiosulfates is +2; the valence of sulfur in polythionates is in the range of from about +1⅔ to about +5; and the valence of sulfur in dithionites is +3. The valence of sulfur in sulfates is +6. The valence of elemental sulfur is zero. Thiosulfates, polythionates and dithionites are compounds whose anions have sulfur-to-sulfur bonds. Accordingly, the sulfur component of sulfides, mercaptans, sulfites, reactive multi-sulfur compounds and mixtures thereof can be changed from a reactive form, that is, a hazardous form, to a non-reactive form, that is, a non-hazardous form, by reacting such compounds with an effective quantity of a suitable oxidizing agent to convert such compounds to sulfates or elemental sulfur.

Neither elemental sulfur nor sulfates cause stress corrosion cracking of stainless steel and are not believed to be a source of danger to the physical health of people.

If at least some sulfide contacted by the oxidizing agent useful herein is in the form of a water insoluble iron sulfide, then the oxidizing agent only contacts the surface of the sulfide to form iron ions and sulfide ions. The iron ions immediately oxidize under the pH conditions employed in the method to form a layer or film of insoluble ferric oxide on the surface of the iron sulfide which shields the remaining iron sulfide from any surrounding environment. The sulfide ions released from the iron sulfide are then changed from a reactive form, that is, a hazardous form, to a non-reactive form, that is, a non-hazardous form, by the oxidizing agent as described above.

Selection of an oxidizing agent suitable for use herein is a critical feature of the invention. In this connection, an oxidizing agent to be useful herein must perform the desired functions of completely converting reactive sulfur to non-reactive sulfur and rendering pyrophoric iron sulfide inactive, but must not produce a compound or a by-product which is hazardous or environmentally offensive.

Very strong oxidizing agents can certainly produce the mentioned desired functions, but produce undesirable by-products. Potassium permanganate is an example of a very strong oxidizer which is not useful herein. It has been discovered herein that potassium permanganate, when reacted with a hazardous sulfur containing compound, produces manganese dioxide, a known powerful oxidizing agent not desired by operators to be present in an operation which may also include the presence of reducing agents.

It has also been discovered herein that weak oxidizing agents can partially convert reactive sulfur to non-reactive sulfur and can render pyrophoric iron sulfide inactive. However, a by-product of a weak oxidizing agent can be a compound which contains reactive sulfur, the presence of which would defeat the goal of preventing stress corrosion cracking. Lauryl dimethylamine-N-oxide, as well as amine oxides disclosed in U.S. Pat. No. 5,459,066, is an example of a weak oxidizer which is not useful herein. In this regard, lauryl dimethylamine-N-oxide, renders pyrophoric iron sulfide inactive and, when reacted with a hazardous sulfur containing compound, such as hydrogen sulfide, completely destroys the sulfide but produces a variety of materials, including undesirable sulfur compounds having anions within the scope of equation (1), above.

It had been speculated herein that hydrogen peroxide would be a suitable oxidizer for use herein. However, it was discovered that the stability of hydrogen peroxide rendered its use unpredictable. It was found that hydrogen peroxide would indeed perform the desired functions. However, hydrogen peroxide is known to be inherently hazardous in a commercial setting due to its tendency to rapidly decompose with the generation of heat and the uncontrolled evolution of very large volumes of free oxygen. Similarly, alkali metal peroxides, such as sodium peroxide and potassium peroxide, can rapidly produce hydrogen peroxide which then produces the undesirable products described above. Thus alkali metal peroxides are also not useful in the method of this invention.

Accordingly, the problem to be solved was to select and employ an oxidizing agent having the desirable features of hydrogen peroxide and the alkali metal peroxides, but not the undesirable stability of those compounds. It is believed that the release and use of the peroxy moiety, as exemplified in hydrogen peroxide, in an amount sufficient to perform the desired functions of the method of this invention without risking the generation of undesirable quantities of heat and the uncontrolled evolution of very large volumes of free oxygen can be accomplished with water soluble inorganic persulfates and water soluble inorganic and organic adducts of hydrogen peroxide defined by the general structure:

$$C \cdot YH_2O_2 \cdot ZH_2O \qquad (2)$$

wherein C is an organic material or an inorganic borate or carbonate, Y has a value in the range of from about 1.0 to about 1.5 and Z has a value in the range of from about 0 to about 3. C is preferably an alkali metal borate or carbonate or an organic material which will not be attacked and destroyed by hydrogen peroxide and which will crystallize from an aqueous solution of hydrogen peroxide having hydrogen peroxide molecules in its hydration shell.

Compounds within the scope of equation (2), above, react with insoluble iron sulfide, as described above, and water-soluble, hazardous sulfur containing compounds to produce either water soluble sulfates or, in the case of sulfides, a combination of water soluble sulfates and a precipitate of some elemental sulfur which remains suspended as a sol in water. There are no known by-products of the reactions between compounds within the scope of equation (2) and reactive sulfur which are hazardous or environmentally offensive.

Specific examples of oxidizing agents within the scope of equation (2) believed to be useful in the method of this invention include organic peroxides, inorganic perborates and inorganic percarbonates, preferably alkali metal perborates and percarbonates. Specific examples of oxidizers useful herein include sodium perborate, $NaBO_2 \cdot H_2O_2 \cdot 3H_2O$, sodium percarbonate, $Na_2CO_3 \cdot 1.5H_2O_2$ and percarbamide, $CO(NH_2)_2 \cdot H_2O_2$. The most preferred oxidizing agent useful herein is sodium perborate.

The inorganic persulfates also react with insoluble iron sulfide, as described above, and water-soluble, hazardous sulfur containing compounds to produce water soluble sulfates. There are no by-products of the reaction between inorganic persulfates and reactive sulfur which are hazardous or environmentally offensive. Preferred inorganic persulfates are alkali metal persulfates and their equivalents, such as, sodium persulfate, $Na_2S_2O_8$, potassium persulfate, $K_2S_2O_8$ and ammonium persulfate, $(NH_4)_2S_2O_8$.

The sulfate reaction products, such as alkali metal sulfates, i.e., sodium sulfate, obtained with the oxidizing agents useful herein are soluble in aqueous solution and are believed to be harmless.

It has been found that mercaptans upon being reacted with the oxidizing agents of this invention in the presence of oil, such as crude oil, can also produce organic disulfides. Organic disulfides are oil-soluble and are not believed to be a source of stress corrosion cracking. Accordingly, organic disulfides are not reactive multi-sulfur compounds within the scope of this invention.

According to the broad invention, the results desired by performance of the method of this invention can be obtained with the pH of the aqueous solution of the oxidizing agent useful herein being any value in the range of from about 0 to about 14. However, it is noted that ferric oxide is not soluble in an aqueous environment having a pH greater than about 3.5. Therefore, the pH of the solution is preferably in the range of from about 4 to about 11 and still more preferably in the range of from about 6 to about 8. The most preferred pH is in the range of 7 to 8. In this regard, sodium perborate and sodium percarbonate, as well as the water soluble inorganic persulfates and the other water soluble inorganic and organic adducts of hydrogen peroxide, exist as stable, solid materials, and, as such, have reasonable shelf life if stored at ambient to cool conditions. However, when the oxidizers, particularly the adducts of hydrogen peroxide, are added directly to water decomposition proceeds with visible evolution of free oxygen. Decomposition reduces the concentration of oxidizer available to perform as desired. It is believed that the decomposition is linked to high pH generated when the oxidizer dissolves in water.

In view of the above, it is preferred to employ the oxidizers in aqueous solutions which have been buffered to resist increase in pH upon dissolution. Accordingly, a solution having a pH in the range of from about 6 to about 8 is first prepared by adding a suitable acid to water. Thereafter, an oxidizer useful herein, such as sodium perborate or sodium percarbonate, is dissolved in the solution to prepare a concentrate which can thereafter be diluted prior to use. By employing this order of mixing, high pH values will not occur upon addition of the oxidizer to thereby avoid decomposition of the oxidizing agent. Furthermore, the oxidizing agent will remain stable in the concentrate and will not experience substantial decomposition for a period of about one month to thereby enable an operator to formulate and maintain an inventory of material for anticipated future performances of the method of this invention.

Inorganic persulfates also decompose in the presence of high pH, but it is believed that they are not as sensitive to high pH as are the hydrogen peroxide adducts. Accordingly, an upper limit pH greater than 8 and as high as 11 can be employed in buffered solutions of inorganic persulfates.

Acids suitable to form buffered solutions in the pH range of 6 to 8 include citric acid, acetic acid and phosphoric acid. Acetic acid is preferred. A typical buffered solution useful herein contains 5 grams of acetic acid and 9 grams of sodium perborate dissolved in water to a total solution volume of 100 milliliters. Another typical buffered solution useful herein contains 17 pounds of sodium perborate and 6 pounds of citric acid dissolved in 55 gallons of water to produce a calculated concentration of 3.7% sodium perborate by weight of solution, which is a concentrate of 37000 ppm oxidizer. Persons skilled in the art, by utilizing the above recipes as guides, can readily prepare buffered solutions of other oxidizing agents useful in the practice of the method of this invention.

The method is preferably conducted at a temperature in the range of from about 70° F. to a value less than about the boiling point of the solution, preferably about 150° F. to about 190° F.

The oxidizing agent employed must be one having strength sufficient to increase the valence state of the sulfur in the compound to a value of +6. Examples of such agents are provided above.

It is believed that the quantity of oxidizing agent useful herein sufficient to increase the valence of sulfur from some value in the range of from −2 to +5 to a value of +6 is an amount in the range of from about 3 moles to about 12 moles of oxidizer per mole of sulfur compound to be oxidized. However, in a typical industrial setting, the actual quantity of hazardous sulfur containing compound to be treated is not usually readily available, therefore, the quantity of oxidizer to be employed cannot be calculated with precision. Accordingly, the amount of oxidizer initially employed in an industrial application is an amount in the range of from about 500 to about 2000 parts oxidizer per million parts of aqueous solution. Thus, the hazardous sulfur containing compound, or compounds, to be treated can be initially contacted with an aqueous solution containing about 2000 ppm oxidizer. It is obvious that the above described concentrate must be diluted with water, such as at the location of use, to obtain an aqueous solution having the quantity of oxidizer within the range previously mentioned. The concentration of oxidizing agent can be continuously monitored by known analytical methods during performance of the process and oxidizing agent can be added to the solution to maintain an oxidizer concentration of at least about 500 ppm.

In the performance of the method, the vessel to be decontaminated is first isolated from other vessels by methods known in the art. Thereafter, the vessel is drained of its contents, preferably in a manner which will prevent the entry of oxygen into the interior of the vessel. Thereafter, the concentrate, which can be diluted in place, or the diluted concentrate, is introduced into the vessel to establish contact with the hazardous sulfur containing compounds therein.

The contact between the sulfur compound (or compounds) to be treated and the oxidizer can be effected by simple fill and soak techniques. However, contact is preferably established by dynamic means. In this regard, unreacted oxidizing agent and untreated sulfur compound can be continuously mechanically mixed together in a container in order to establish continuous contact between the sulfur compound and fresh oxidizing agent for a time sufficient to convert reactive sulfur to unreactive sulfur. Establishing contact by dynamic means is especially useful in a situation where the sulfur compound adheres to a substrate and/or is shielded by a coating of some sort or enclosed in a capsule. In this regard the oxidizer can be circulated in a container holding the sulfur compound to be treated to assure the presence of unreacted oxidizing agent in reactive contact with untreated sulfur compound. If the sulfur compound is shielded by a coating, as mentioned, then a suitable surfactant can be employed to help penetrate the coating to assist the oxidizing agent to establish contact with the sulfur compound. One material found to be useful as a surfactant herein is lauryl dimethylamine oxide, as well as, materials disclosed in U.S. Pat. No. 5,459,066.

The contact time is a function of the concentration of oxidizing agent in the aqueous solution. In this regard, the concentration of oxidizing agent in the solution will decrease as the valence of sulfur increases. Thus, the valence of all oxidizable sulfur available for oxidation will be considered to have been increased to a value of +6 when the concentration of oxidizing agent in the aqueous solution stabilizes at some constant value. As a matter of prudent practice, contact is maintained at a constant concentration of oxidizer for a time in the range of from about 1 to about 2 hours to help assure complete oxidation of all sulfur to a valence of +6.

As previously mentioned, the reactive multi-sulfur compounds referred to herein are more specifically thiosulfates, polythionates and dithionites having anions identified by the general structure:

$$[SO_a-S_x-SO_b]^{-2} \quad (1)$$

wherein X is 0 to 4, a is 0 to 3, and b is 2 or 3.

A thiosulfate is a compound having a single sulfur-to-sulfur bond, the anion of which is within the scope of the above general structure. The anion of a thiosulfate compound has a valence of −2 and is more specifically identified by the formula:

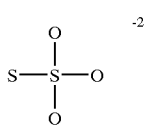

(3)

The average valence state of the sulfur atoms in a thiosulfate compound is +2.

A polythionate is a compound having at least one sulfur-to-sulfur bond, the anion of which is within the scope of the above mentioned general structure. The anion of a polythionate compound has a valence of −2 and is more specifically identified by the formula:

(4)

wherein W is an integer having a value in the range of 0 to 4 and preferably 0 to 3. The average valence state of the sulfur atoms in a polythionate compound is +5 when W is 0; +3⅓ when W is 1; +2.5 when W is 2; +2.0 when W is 3; and +1⅔ when W is 4. Furthermore W is 0, the compound is referred to as a dithionate; when W is 1, the compound is referred to as a trithionate; and when W is 2, the compound is referred to as a tetrathionate.

A dithionite, also known as a hyposulfite and a hydrosulfite, is a compound having a single sulfur-to-sulfur bond, the anion of which is within the scope of the above mentioned general structure. The anion of a dithionite compound has a valence of −2 and is more specifically identified by the formula:

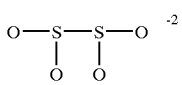

(5)

The average valence state of the sulfur atoms in a dithionite compound is +3.

EXAMPLES

Example 1

An aqueous solution comprised of mercaptans and sulfides and maintained at a temperature of 150° F. can be mixed with an aqueous solution of lauryl dimethylamine-N-oxide having a pH of 7 for a time sufficient to oxidize said mercaptans and sulfides to produce a first modified solution comprised of elemental sulfur, sulfites, sulfates, thiosulfates, tetrathionates and other reactive multi-sulfur compounds. Thereafter, an aqueous solution of sodium perborate having a pH of 7 can be added to the first modified solution to thereby produce a second modified solution in which all of the original mercaptans and sulfides and all of the sulfites, thiosulfates, tetrathionates and other reactive multi-sulfur compounds can be converted to sodium sulfate.

Example 2

Samples of crude oil contaminated with hydrogen sulfide were reacted with 100 milliliters of an aqueous solution of sodium perborate. The reactions were conducted at pH values in the range of 5 to 8 with constant stirring at 100° F. for 1 to 2 hours. Each sample of crude oil tested contained about 3 percent sulfur by weight. The results are set out in Table 1.

TABLE 1

| sample | Borate percent | Crude Oil grams | pH | Sulfite mg/lit | Sulfate mg/lit | Thiosulfate and Tetrathionate mg/lit |
|---|---|---|---|---|---|---|
| 1 | 8.85 | 10.0 | 5.62 | 0.0 | 137 | 0 |
| 2 | 8.85 | 10.0 | 5.62 | 1.9 | 168 | 0 |
| 3 | 8.24 | 10.0 | 6.06 | 2.0 | 183 | 0 |
| 4 | 8.07 | 10.0 | 7.63 | 7.4 | 183 | 0 |
| 5 | 8.07 | 4.2 | 6.06 | 0.0 | 135 | 0 |
| 6 | 8.07 | 4.2 | 7.85 | 3.7 | 137 | 0 |

Example 3

One hundred gallons of a 9% sodium perborate concentrate solution is prepared by first adding 40 pounds of acetic acid to approximately 80 gallons of de-ionized water in a container of suitable capacity and then adding 74 pounds of sodium perborate tetrahydrate to the container. The contents of the container are stirred continuously for approximately 15 minutes or until all of the sodium perborate is dissolved. The solution is then diluted with a sufficient quantity of de-ionized water to obtain a final volume of 100 gallons of sodium perborate concentrate solution.

A vessel fabricated from 304 stainless steel components having a capacity of 2250 gallons which is contaminated with residual crude oil contaminated with known hazardous sulfur containing compounds is provided.

Prior to provision of the vessel, it will have held crude oil which had been contaminated with the mentioned hazardous sulfur containing compounds. The contaminated crude oil will have been drained of its liquid contents under a nitrogen blanket.

Fifty gallons of the sodium perborate concentrate solution together with 2,200 gallons of de-ionized water is added to the vessel containing the mentioned residual crude oil and known hazardous sulfur containing compounds. A buffering material, such as sodium carbonate, is also added to the vessel as necessary to adjust the pH of the solution in the vessel to a value in the range of from about 7 to about 8. At this point the concentration of sodium perborate in the vessel is 0.2% sodium perborate by weight of solution or about 2000 parts sodium perborate per million parts of solution.

The vessel and its contents are heated to a temperature of 180° F., and the contents of the vessel are continuously circulated to promote contact between the perborate solution and the hazardous sulfur containing compounds. The aqueous content of the vessel is sampled as soon as practicable and analyzed for active sodium perborate. The analysis is conducted to enable maintenance of an active concentration sodium perborate at a value of at least 500 parts per million.

The treating solution is drained from the vessel after a period of contact of about 2 to 3 hours at 180° F., during which time the concentration of sodium perborate is maintained at a value in the range of from about 500 parts per million to about 2000 parts per million. At this point all soluble, hazardous sulfur containing compounds will have been converted either to elemental sulfur or to the sulfate ion. In addition, all insoluble, hazardous sulfur containing compounds, such as FeS, will have been coated with a layer of iron oxide to shield and thereby inactivate the insoluble hazardous sulfur containing compounds.

Having thus described the invention that which is claimed is:

1. A method of decontaminating a closed vessel having an interior surface in contact with a first compound containing sulfur in a reactive form, said method being comprised of converting said first compound to a product selected from the group consisting of a second compound, elemental sulfur and mixtures thereof, wherein said second compound contains sulfur in a non-reactive form and is different from said first compound, the steps of said method comprising:

providing a closed vessel having an interior surface in contact with said first compound, introducing into said closed vessel an aqueous solution comprising an effective quantity of an oxidizing agent, establishing contact between said aqueous solution of said oxidizing agent and said first compound, and maintaining said contact between said aqueous solution of said oxidizing agent and said first compound for a time sufficient to convert said first compound to said product;

said first compound is selected from the group consisting of water soluble compounds containing sulfur-to-sulfur bonds having an anion defined by the general structure $$[SO_a\text{—}S_x\text{—}SO_b]^{-2}$$

wherein X is 0 to 4, a is 0 to 3, and b is 2 or 3, mercaptans, water soluble sulfides, water insoluble sulfides, sulfites, and mixtures thereof;

said second compound is a sulfate;

said aqueous solution has a temperature in the range of from about 70° F. to a value less than about the boiling point thereof, and a pH in the range of from about 7 to about 11; and said oxidizing agent is selected from the group consisting of water soluble inorganic persulfates, water soluble inorganic and organic adducts of hydrogen peroxide and mixtures thereof, wherein said adducts of hydrogen peroxide are defined by the general structure $$C.YH_2O_2.ZH_2O$$

wherein C is an organic material or an inorganic borate or carbonate, Y has a value in the range of from about 1.0 to about 1.5 and Z has a value in the range of from about 0 to about 3.

2. The method of claim 1 wherein said contact between said aqueous solution of said oxidizing agent and said first compound occurs at a temperature in the range of from about 150° F. to about 190° F. and the quantity of said oxidizing agent in said solution is an amount in the range of from about 500 to about 2000 parts of said oxidizing agent per million parts of said aqueous solution.

3. The method of claim 2 further comprising maintaining said quantity of said oxidizing agent in said aqueous solution at a value of at least about 500 parts of said oxidizing agent per million parts of said aqueous solution during said contact and terminating said contact after said quantity of said oxidizing agent remains constant for a time in the range of from about 1 to about 2 hours.

4. The method of claim 3 wherein the material of construction of said interior surface in contact with said first compound is susceptible to stress corrosion cracking.

5. The method of claim 4 wherein said material of construction is Austenitic steel.

6. The method of claim 4 wherein said water insoluble sulfides in said first compound are comprised of pyrophoric iron sulfide.

7. The method of claim 3 wherein said first compound is pyrophoric iron sulfide.

* * * * *